United States Patent [19]

Hansbrough

[11] Patent Number: 5,412,904
[45] Date of Patent: May 9, 1995

[54] INSECT DESTROYING APPARATUS

[76] Inventor: Willie H. Hansbrough, 1987 Big Bend, Memphis, Tenn. 38116

[21] Appl. No.: 235,360

[22] Filed: Apr. 29, 1994

[51] Int. Cl.⁶ .............................................. A01M 7/00
[52] U.S. Cl. ...................................... 43/132.1; 43/124
[58] Field of Search .................. 43/124, 132.1; 52/101

[56] References Cited

U.S. PATENT DOCUMENTS 4,648,202 3/1987 Renth ................................. 43/132.1
4,944,110 7/1990 Sims ..................................... 43/124

*Primary Examiner*—Kurt Rowan
*Attorney, Agent, or Firm*—John J. Mulrooney

[57] ABSTRACT

An apparatus for preventing insects from entering a building through a doorway having an inner door separated by an air space from an outer door, which includes an aerosol can holder mounted on a vertical doorjamb between the doors; an aerosol can of insecticide having an upwardly extending spray nozzle positioned in the holder; a hinged, vertically movable lever projecting over the holder; a cam element mounted on the lever positioned and shaped to engage and depress the spray nozzle of the aerosol can; a first cable connected to the lever and extending through the inner door so as to be accessible inside the building and a second cable connected to the lever and extending through the outer door so as to be accessible outside the building; and, when either the first cable or the second cable is pulled, the lever will move downwardly to depress the nozzle and spray insecticide into the airspace between the doors to destroy any insects before the inner door is opened and the insects are able to enter the building.

6 Claims, 3 Drawing Sheets

INSECT DESTROYING APPARATUS

FIELD OF THE INVENTION

This invention relates to an apparatus for preventing insects from entering buildings through entrance ways, and more particularly to a novel apparatus for spraying insecticide into the airspace between the inner and outer doors of a building entrance way, whereby any flies and other insects in that airspace will be destroyed before the inner door is opened.

BACKGROUND OF THE INVENTION

Since time immemorial, human beings have had an aversion to insects. From their nasty bites to their annoying buzzing sounds, insects have acquired a most distasteful reputation. Certain insects are also known to carry and transmit disease, such as malaria and lyme's disease.

Previous attempts have been made to provide protection against insects. For example, a fly swatter device has been used by people for many years to kill insects. In recent decades, chemical insecticides have been discovered, that allow for mass destruction of any insects the insecticides come in contact with. In addition, electrified neon lights that electrocute any insects unfortunate enough to come in contact with the lights, are currently in use.

Problems exist with prior insect destroying devices. For example, a person operating the device is exposed to the insects and a person using a chemical insecticide must deal with its offensive odor.

Accordingly, it is an object of the invention to provide a new and improved apparatus for destroying insects, such that the person operating the apparatus is not exposed to the insects.

It is another object of the invention to allow the odor of a chemical insecticide to dissipate before the person operating the apparatus enters the sprayed area.

It is another object of the invention to provide a new and improved apparatus for effectively preventing insects from entering a building through an entrance way having inner and outer doors.

SUMMARY OF THE INVENTION

To achieve the foregoing and other objectives, and in accordance with a preferred embodiment of the present invention, an insect destroying apparatus for preventing insects from entering a building through an entrance way includes a doorway having an inner door separated by an air space from an outer door; an aerosol can holder mounted on a vertical doorjamb between the doors; an aerosol can of insecticide having an upwardly extending spray nozzle positioned in the holder; a hinged, vertically movable lever projecting over the holder; a cam element mounted on the lever positioned and shaped to engage and depress the spray nozzle of the aerosol can; a first cable connected to the lever and extending through the inner door so as to be accessible inside the building and a second cable connected to the lever and extending through the outer door so as to be accessible outside the building; and, when either the first cable or the second cable is pulled, the lever will move downwardly to depress the nozzle and spray insecticide into the airspace between the doors to destroy any insects before the inner door is opened and the insects are able to enter the building. Of course, any means for depressing the spray nozzle and injecting insecticide into the space between the doors is within the scope of the present invention. Also, the insect destroying apparatus can be used with either transparent or opaque doors. It is not necessary that the insects are visible prior to engaging the apparatus.

In the operation of the insect destroying apparatus, the cam element is engaged by pulling on either of the two cables, such that insecticide is released from the aerosol can. The release of the chemical insecticide between the two doors kills any insects present in that enclosed area. Thereafter, when time has been allowed for the insecticide to dissipate, the person who engaged the insect destroying apparatus can now open either door and face an insect-free environment, with little or no smell of insecticide remaining. A separate cable is provided for each door, in order to allow the insect destroying device to be used, whichever of the two doors is opened first.

BRIEF DESCRIPTION OF THE DRAWINGS

FIG. I is a perspective view of a building doorway having inner and outer doors separated by an airspace with the novel fly and insect destroying apparatus of the present invention mounted on the vertical doorjamb between the doors showing the cables before being extended through the inner and outer door.

DESCRIPTION OF PREFERRED EMBODIMENT

Figure 1:
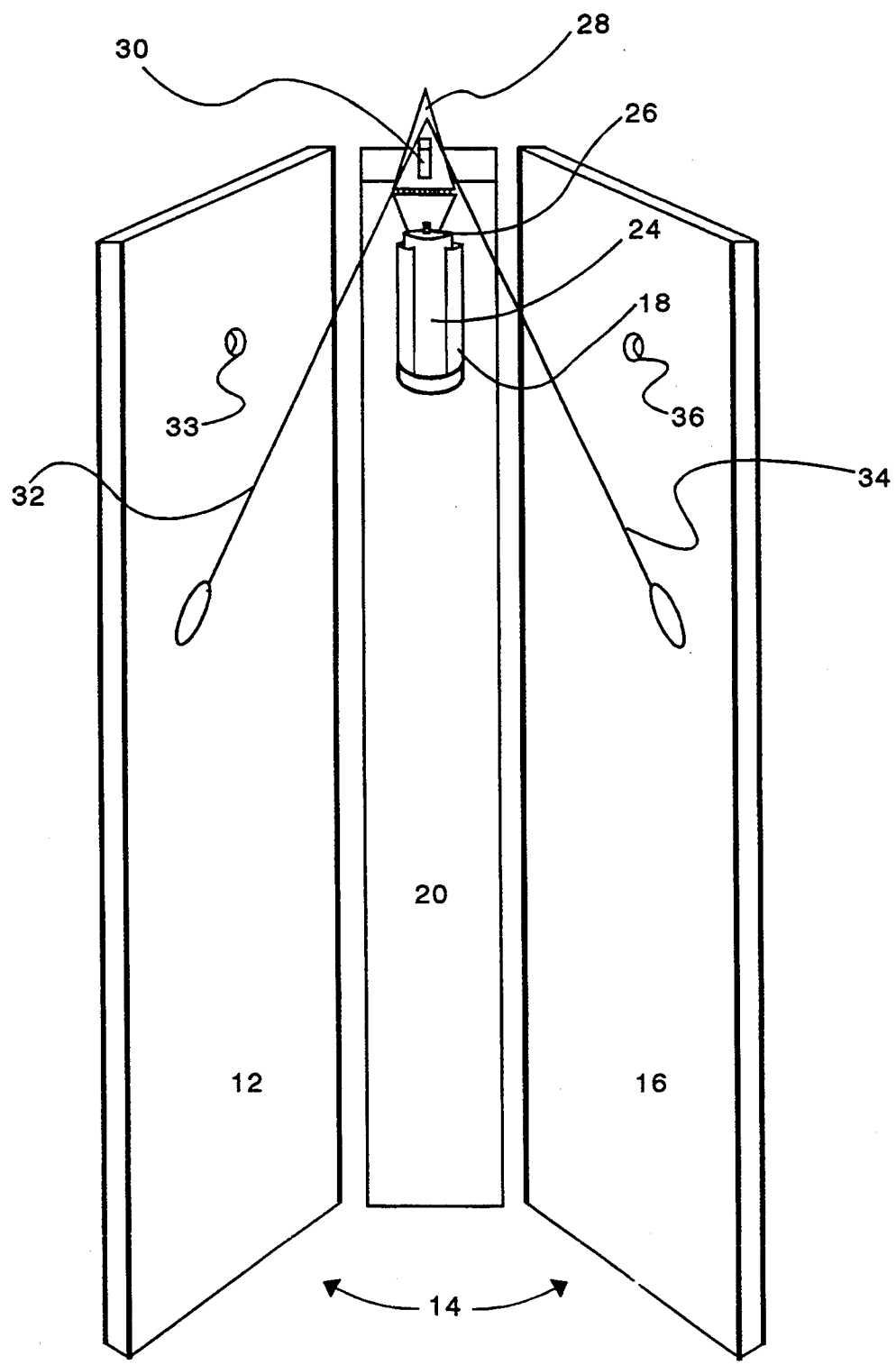
Figure 2:
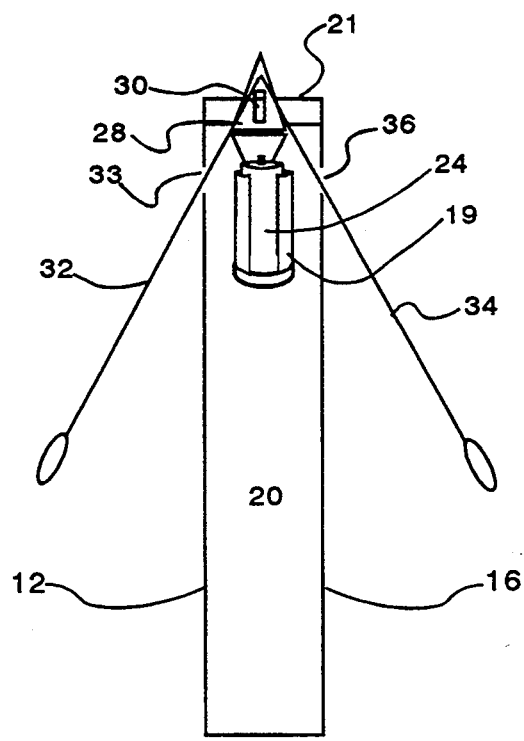
FIG. 2 is a front elevational view of the insect destroying apparatus mounted on a vertical doorjamb in the airspace that separates the inner and outer doors of a building doorway showing the cables after being extended through the inner and outer doors.

Referring to the drawings, there is illustrated an apparatus for preventing insects from entering a building (not shown) through an entrance way having an inner door 12 separated by an air space 14 from an outer door 16.

Figure 3:
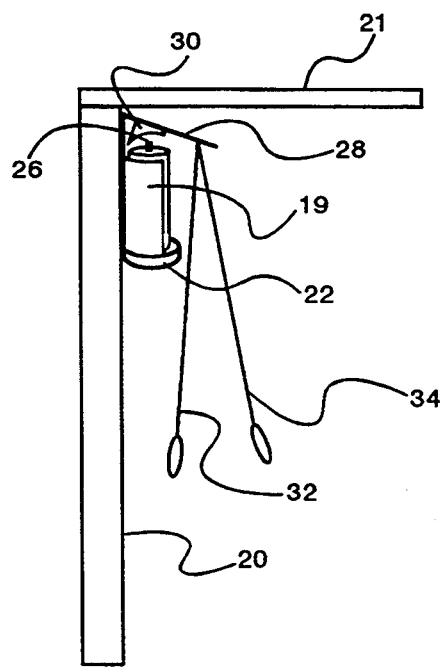
FIG. 3 is a side elevational view of the insect destroying apparatus mounted on a vertical doorjamb in the airspace that separates the inner and outer doors of a building doorway.

A vertical doorjamb 20 and an upper horizontal doorjamb 21 (FIG. 3) combine with the doors 12 and 16 and another vertical doorjamb (not shown) and a lower horizontal doorjamb (not shown) to define the enclosed airspace indicated at 14)

Figure 4:
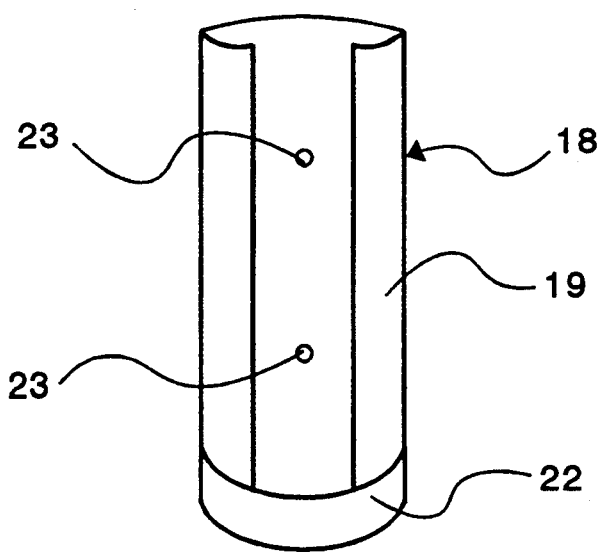
FIG. 4 is a perspective view of the aerosol can holder of the present invention.
Figure 5:
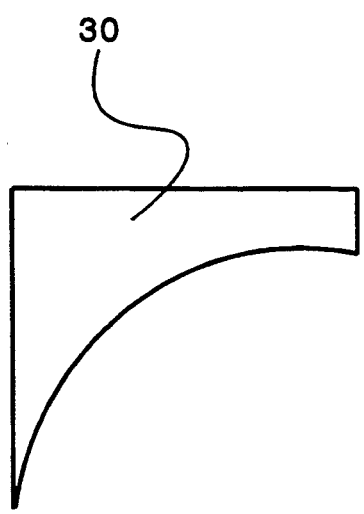
FIG. 5 is a side elevational view of the cam element of the present invention.

An aerosol can holder 18 (FIG. 4) is mounted on vertical doorjamb 20 and has vertical sides 19 and a horizontal support base 22 adapted to receive and support an aerosol can 24. A pair of holes 23 are useful for mounting the holder 18 on the vertical doorjamb 20 between the doors. The aerosol can of insecticide 24 has an upwardly extending spray nozzle 26. A hinged, vertically movable lever 28 projects horizontally over the aerosol can 24 positioned in the holder 18. A cam element 30 (FIG. 5) is mounted on the lever 28 and is positioned and shaped to engage and depress the spray nozzle 26 of the aerosol can when the lever is rotated downwardly. A first cable 32 is connected to the lever 28 and extends through a hole 33 in the inner door 12 so as to be accessible inside the building. A second cable 34 is connected to the lever 28 and extends through a hole 36 in the outer door 14 so as to be accessible outside the building. The design and positioning of the apparatus is such that when either the first cable or the second cable is pulled, the lever will move downwardly to depress the nozzle and spray insecticide into the airspace 14 between the doors to destroy any insects before either door is opened and the insects are able to enter the building. Of course, any means, e.g., manual, automatic or remote, for depressing the spray nozzle without opening either door is within the scope of the present invention.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

Wherefore, having thus described my invention, what is claimed is:

1. Apparatus for destroying flies and insects in the airspace between the inner and outer doors of a building doorway without opening either door comprising:
    a doorway to a building having an inner door opening into said building and an outer door opening to the outdoors, said doorway having a vertical doorjamb and an airspace separating said doors;
    a holder having a bottom member for supporting an aerosol can and a hinged, vertically movable lever projecting over said bottom member; said holder being mounted on said vertical doorjamb;
    an aerosol can of insecticide having an upwardly extending spray nozzle; said can being positioned on said bottom member;
    a cam element mounted on said lever so as to engage said nozzle when said lever is moved downwardly;
    a first cable connected to said lever extends through said inner door to inside said building; and
    a second cable connected to said lever extends through said outer door to outside said building, whereby insecticide may be sprayed into said airspace by pulling either said first or second cable to move said lever downwardly to cause said cam to engage said nozzle.

2. The apparatus as in claim 1, wherein the doors are opaque.

3. The apparatus as in claim 1, wherein the doors are transparent.

4. In combination with a building entrance way having an inner door opening into said building, an outer door opening to the outdoors, and said doors defining a passageway for ingress and egress and forming an air space between said doors, apparatus for destroying insects in said air space without opening either said inner or outer doors comprising:
    means located within said passageway for injecting an insecticide into said air space;
    a first actuating means accessible from inside said building for causing said insecticide to be injected into said air space; and
    a second actuating means accessible from outside said building for causing said insecticide to be injected into said air space.

5. The apparatus as in claim 4, wherein the doors are opaque.

6. The apparatus as in claim 4, wherein the doors are transparent.

* * * * *